(12) United States Patent
Huang et al.

(10) Patent No.: US 12,292,825 B2
(45) Date of Patent: May 6, 2025

(54) MEMORY CONTROL METHOD, MEMORY STORAGE DEVICE AND MEMORY CONTROL CIRCUIT UNIT

(71) Applicant: PHISON ELECTRONICS CORP., Miaoli (TW)

(72) Inventors: Sheng-Min Huang, Hsinchu County (TW); Shih-Ying Song, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 17/726,474

(22) Filed: Apr. 21, 2022

(65) Prior Publication Data

US 2023/0281114 A1    Sep. 7, 2023

(30) Foreign Application Priority Data

Mar. 2, 2022   (TW) .................................. 111107543

(51) Int. Cl.
*G06F 12/02* (2006.01)
*G06F 13/16* (2006.01)

(52) U.S. Cl.
CPC ...... *G06F 12/0238* (2013.01); *G06F 12/0246* (2013.01); *G06F 13/1668* (2013.01); *G06F 2212/2022* (2013.01)

(58) Field of Classification Search
CPC ......... G06F 12/0246; G06F 2212/2022; G06F 2212/72; G06F 3/06; G06F 3/061; G06F 3/0611; G06F 3/0613; G06F 3/0625; G06F 3/0629; G06F 3/0658; G06F 3/0659; G06F 3/0679; G11C 7/10; H03K 19/0005

See application file for complete search history.

(56) References Cited

U.S. PATENT DOCUMENTS

| 10,630,289 | B1 * | 4/2020 | Huang ............... H03K 19/0008 |
| 2004/0228196 | A1 * | 11/2004 | Kwak .................. G11C 5/063 |
| | | | 365/230.03 |

(Continued)

FOREIGN PATENT DOCUMENTS

| CN | 112463018 | 3/2021 |
| TW | 202109522 | 3/2021 |

OTHER PUBLICATIONS

NVDIMM (Non-Volatile Dual In-line Memory Module) by Kranz (Year: 2022).*

(Continued)

*Primary Examiner* — Paul M Knight
(74) *Attorney, Agent, or Firm* — JCIPRNET

(57) ABSTRACT

A memory control method, a memory storage device, and a memory control circuit unit are disclosed. The method includes: generating a first operation command via one of a plurality of processing circuits, wherein the first operation command instructs to access a first memory group in a plurality of memory groups; and in response to a first state information, sending a first command sequence to the first memory group according to the first operation command to instruct the first memory group to perform an access operation. The first state information reflects a first activation state of the plurality of memory groups, and the first command sequence does not include a control command sequence configured to activate the first memory group.

15 Claims, 6 Drawing Sheets

(56) References Cited

U.S. PATENT DOCUMENTS

| | | | | |
|---|---|---|---|---|
| 2010/0005218 | A1* | 1/2010 | Gower | G06F 13/4234 |
| | | | | 711/E12.082 |
| 2013/0159616 | A1* | 6/2013 | Xu | G06F 13/4086 |
| | | | | 711/155 |
| 2014/0002131 | A1* | 1/2014 | Shaeffer | G11C 5/14 |
| | | | | 326/30 |
| 2016/0291894 | A1* | 10/2016 | Yeung | G06F 13/4068 |
| 2017/0005657 | A1* | 1/2017 | Kim | H03K 19/0005 |
| 2019/0052268 | A1* | 2/2019 | Lee | G11C 29/028 |
| 2019/0096468 | A1* | 3/2019 | McCall | G11C 7/1066 |
| 2021/0064119 | A1* | 3/2021 | Mirichigni | G11C 11/2275 |
| 2021/0166743 | A1* | 6/2021 | Itagaki | G11C 7/1045 |

OTHER PUBLICATIONS

ONFI Specification 5.0 (Year: 2021).*
NPL Dovale a Programmable and Low Area on Die Termination 2019.*
"Office Action of Taiwan Counterpart Application", issued on Jan. 9, 2023, p. 1-p. 9.
"Office Action of China Counterpart Application", issued on Jan. 9, 2025, p. 1-12.

* cited by examiner

MEMORY CONTROL METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 111107543, filed on Mar. 2, 2022. The entirety of the above-mentioned patent application is hereby incorporated by reference herein and made a part of this specification.

BACKGROUND OF THE INVENTION

Field of the Invention

The invention relates to a memory control technique, and more particularly, to a memory control method, a memory storage device, and a memory control circuit unit.

Description of Related Art

Smartphones, tablets, and notebook computers have grown rapidly in recent years, resulting in a rapid increase in consumer demand for storage media. Since a rewritable non-volatile memory module (such as a flash memory) has characteristics such as data non-volatility, power-saving, small size, and no mechanical structures, the rewritable non-volatile memory module is very suitable to be built into the various portable multimedia devices provided above.

Generally, before the memory controller accesses a certain memory module, the memory controller needs to issue a specific operation command to activate the memory module. After the memory module is activated, the memory controller may then issue an access command sequence to access the memory module. However, in the control mechanism of a multi-core memory controller, a plurality of central processing units of the multi-core memory controller do not know which memory modules each has accessed from each other. Therefore, each central processing unit of the multi-core memory controller usually sends the above specific operation command before each access to the memory module, in order to attempt to activate the memory module to be accessed. Such redundant behavior also causes the access performance of the multi-core memory controller to decrease.

SUMMARY OF THE INVENTION

The invention provides a memory control method, a memory storage device, and a memory control circuit unit that may improve the access performance of a multi-core memory control circuit unit to a rewritable non-volatile memory module.

An exemplary embodiment of the invention provides a memory control method configured for a rewritable non-volatile memory module. The rewritable non-volatile memory module includes a plurality of memory groups. The memory control method includes: generating a first operation command via one of a plurality of processing circuits, wherein the first operation command instructs to access a first memory group in a plurality of memory groups; and in response to a first state information, sending a first command sequence to the first memory group according to the first operation command to instruct the first memory group to perform an access operation. The first state information reflects a first activation state of the first memory group, the first command sequence does not include a control command sequence, and the control command sequence is configured to activate the first memory group.

An exemplary embodiment of the invention further provides a memory storage device including a connection interface unit, a rewritable non-volatile memory module, and a memory control circuit unit. The connection interface unit is configured to be coupled to a host system. The memory control circuit unit is coupled to the connection interface unit and the rewritable non-volatile memory module. The rewritable non-volatile memory module includes a plurality of memory modules. The memory control circuit unit includes a plurality of processing circuits. One of the plurality of processing circuits is configured to generate a first operation command. The first operation command instructs to access a first memory group in a plurality of memory groups. In response to a first state information, the memory control circuit unit is configured to send a first command sequence to the first memory group according to the first operation command, so as to instruct the first memory group to perform an access operation, wherein the first state information reflects a first activation state of the first memory group, the first command sequence does not include a control command sequence, and the control command sequence is configured to activate the first memory group.

An exemplary embodiment of the invention further provides a memory control circuit unit configured to control a rewritable non-volatile memory module. The rewritable non-volatile memory module includes a plurality of memory modules, and the memory control circuit unit includes a plurality of processing circuits and a command sending circuit. The command sending circuit is coupled to the plurality of processing circuits. One of the plurality of processing circuits is configured to generate a first operation command. The first operation command instructs to access a first memory group in a plurality of memory groups. In response to a first state information, the command sending circuit is configured to send a first command sequence to the first memory group according to the first operation command, so as to instruct the first memory group to perform an access operation, wherein the first state information reflects a first activation state of the first memory group, the first command sequence does not include a control command sequence, and the control command sequence is configured to activate the first memory group.

Based on the above, after one of the plurality of processing circuits generates the first operation command instructing to access the first memory group, in response to the first state information, the first command sequence may be sent to the first memory group according to the first operation command to instruct the first memory group to perform the access operation. In particular, the first command sequence does not include the control command sequence configured to activate the first memory group. Thereby, the access performance of the multi-core memory control circuit unit to the rewritable non-volatile memory module may be improved.

DESCRIPTION OF THE EMBODIMENTS

In general, a memory storage device (also referred to as a memory storage system) includes a rewritable non-volatile memory module and a controller (also referred to as a control circuit). The memory storage device may be used with a host system, such that the host system may write data into the memory storage device or read data from the memory storage device.

Figure 1:
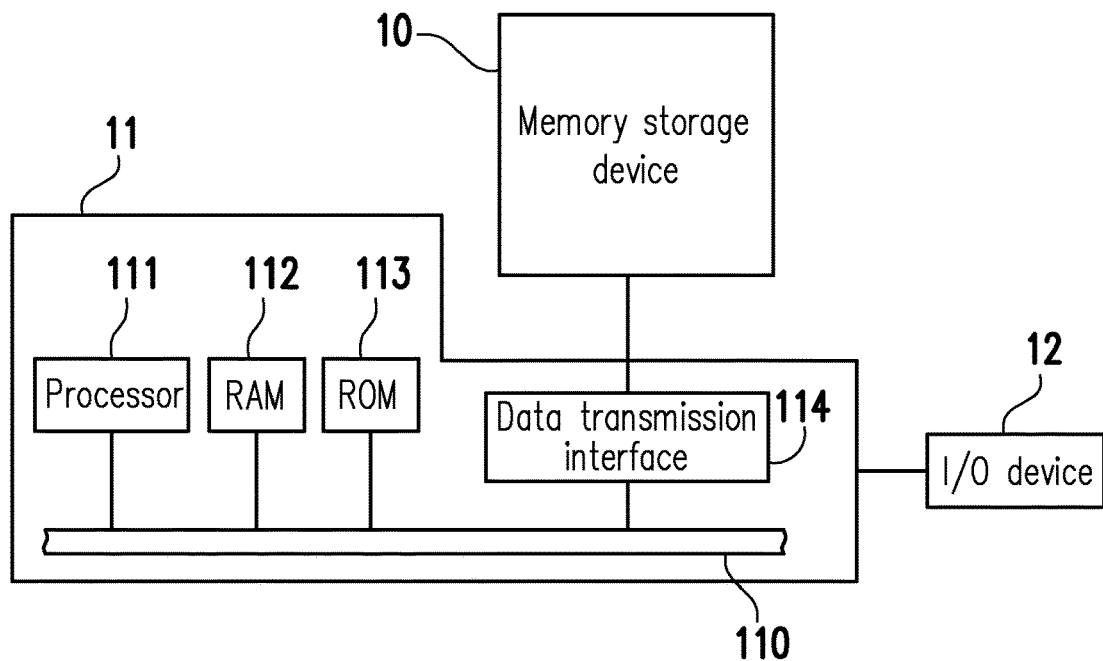
FIG. 1 is a schematic diagram of a host system, a memory storage device, and an input/output (I/O) device shown according to an exemplary embodiment of the invention.
Figure 2:
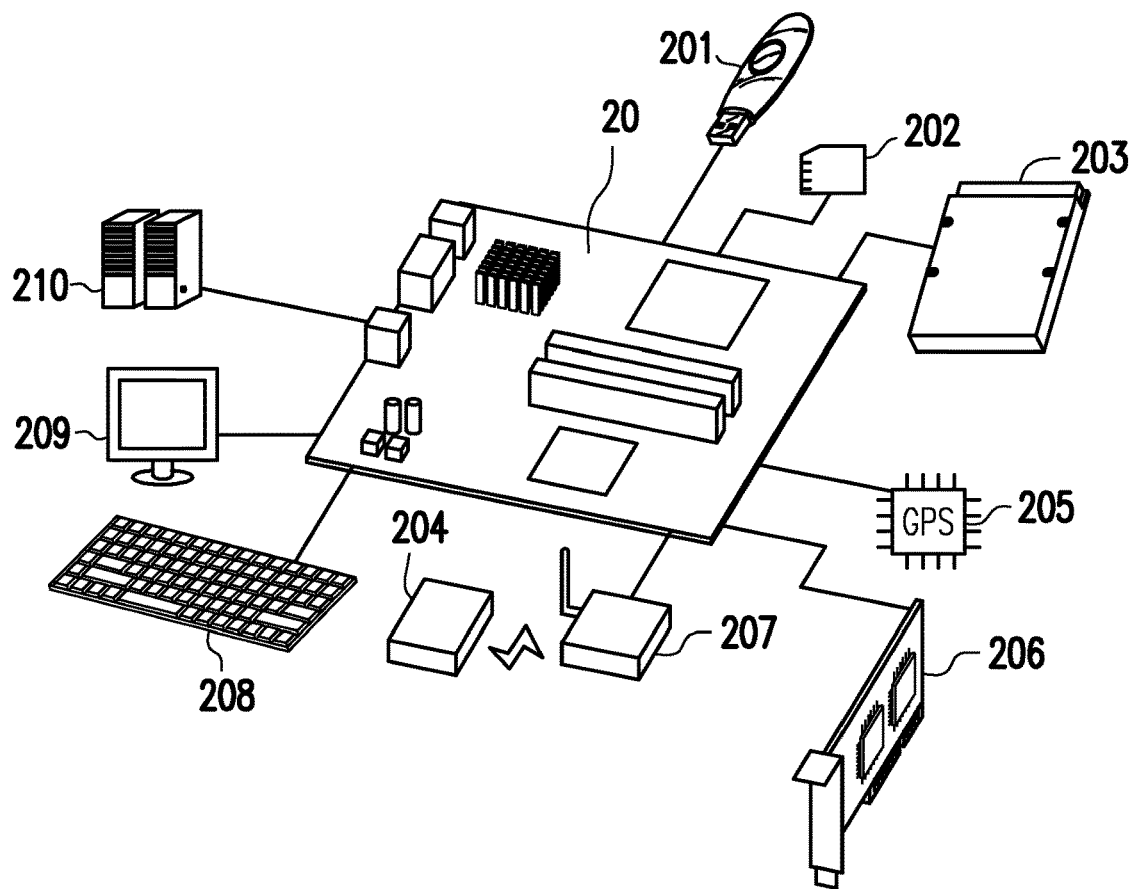
FIG. 2 is a schematic diagram of a host system, a memory storage device, and an I/O device shown according to an exemplary embodiment of the invention.

FIG. 1 is a schematic diagram of a host system, a memory storage device, and an input/output (I/O) device shown according to an exemplary embodiment of the invention. FIG. 2 is a schematic diagram of a host system, a memory storage device, and an I/O device shown according to an exemplary embodiment of the invention.

Referring to FIG. 1 and FIG. 2, a host system 11 may include a processor 111, a random-access memory (RAM) 112, a read-only memory (ROM) 113, and a data transmission interface 114. The processor 111, the RAM 112, the ROM 113, and the data transmission interface 114 may be coupled to a system bus 110.

In an exemplary embodiment, the host system 11 may be coupled to a memory storage device 10 via the data transmission interface 114. For example, the host system 11 may store data into the memory storage device 10 or read data from the memory storage device 10 via the data transmission interface 114. Moreover, the host system 11 may be coupled to the I/O device 12 via the system bus 110. For example, the host system 11 may send an output signal to the I/O device 12 or receive an input signal from the I/O device 12 via the system bus 110.

In an exemplary embodiment, the processor 111, the RAM 112, the ROM 113, and the data transmission interface 114 may be disposed on a motherboard 20 of the host system 11. The quantity of the data transmission interface 114 may be one or a plurality. The motherboard 20 may be coupled to the memory storage device 10 in a wired or wireless method via the data transmission interface 114.

In an exemplary embodiment, the memory storage device 10 may be, for example, a flash drive 201, a memory card 202, a solid-state drive (SSD) 203, or a wireless memory storage device 204. The wireless memory storage device 204 may be, for example, a memory storage device based on various wireless communication techniques such as a near-field communication (NFC) memory storage device, a wireless fax (WiFi) memory storage device, a Bluetooth memory storage device, or a low-power Bluetooth memory storage device (such as iBeacon). Moreover, the motherboard 20 may also be coupled to various I/O devices such as a global positioning system (GPS) module 205, a network interface card 206, a wireless transmission device 207, a keyboard 208, a screen 209, or a speaker 210 via the system bus 110. For example, in an exemplary embodiment, the motherboard 20 may access the wireless memory storage device 204 via the wireless transmission device 207.

In an exemplary embodiment, the host system 11 is a computer system. In an exemplary embodiment, the host system 11 may be any system that may substantially store data with a memory storage device. In an exemplary embodiment, the memory storage device 10 and the host system 11 may respectively include a memory storage device 30 and a host system 31 of FIG. 3.

Figure 3:
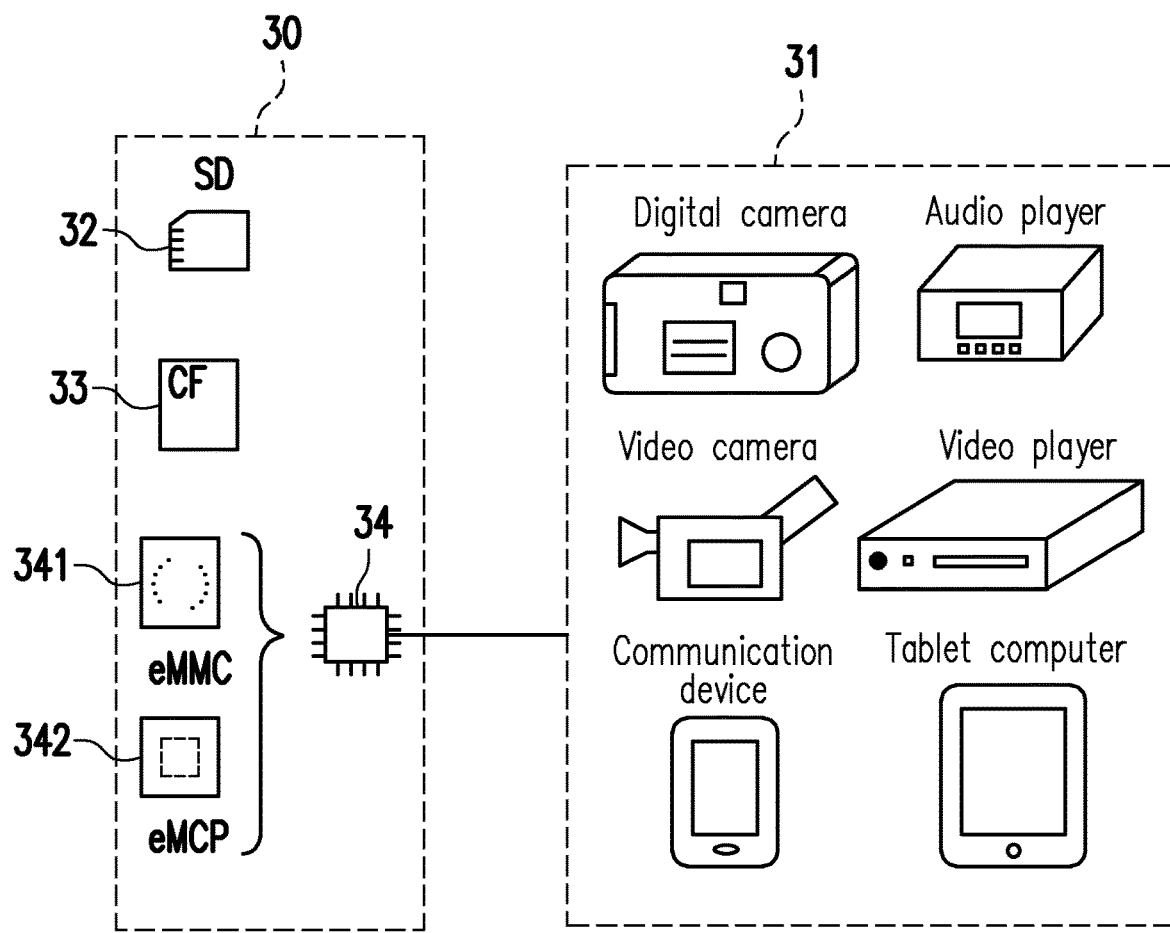
FIG. 3 is a schematic diagram of a host system and a memory storage device shown according to an exemplary embodiment of the invention.

FIG. 3 is a schematic diagram of a host system and a memory storage device shown according to an exemplary embodiment of the invention. Referring to FIG. 3, the memory storage device 30 may be used in conjunction with the host system 31 to store data. For example, the host system 31 may be a system such as a digital camera, a video recorder, a communication device, an audio player, a video player, or a tablet computer. For example, the memory storage device 30 may be various non-volatile memory storage devices such as a Secure Digital (SD) card 32, a Compact Flash (CF) card 33, or an embedded storage device 34 used by the host system 31. The embedded storage device 34 includes various types of embedded storage devices for which a memory module is directly coupled on the substrate of the host system, such as an embedded multimedia card (eMMC) 341 and/or an embedded multi-chip package (eMCP) storage device 342.

Figure 4:
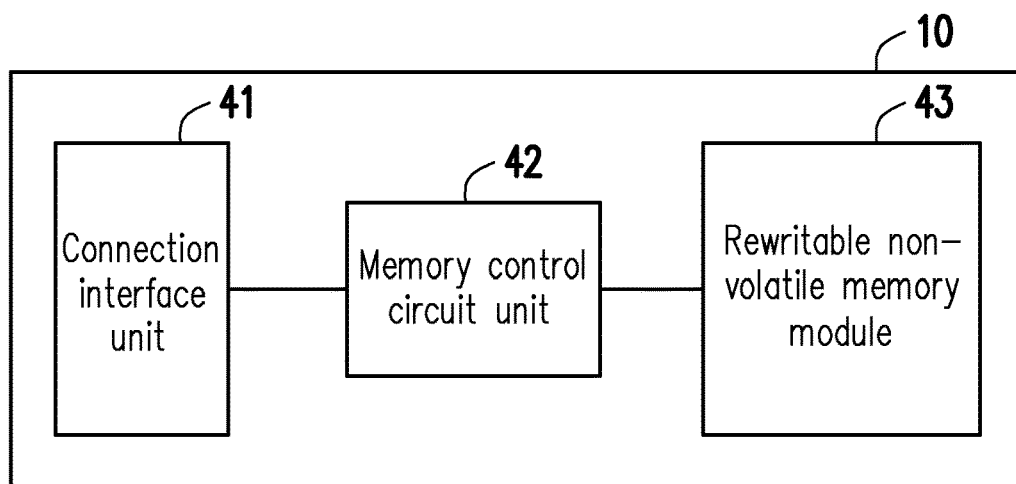
FIG. 4 is a schematic diagram of a memory storage device shown according to an exemplary embodiment of the invention.

FIG. 4 is a schematic diagram of a memory storage device shown according to an exemplary embodiment of the invention. Referring to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may communicate with the host system 11 via the connection interface unit 41. In an exemplary embodiment, the connection interface unit 41 is compatible with the Peripheral Component Interconnect Express (PCI Express) standard. In an exemplary embodiment, the connection interface unit 41 may also conform to the Serial Advanced Technology Attachment (SATA) standard, Parallel Advanced Technology Attachment (PATA) standard, Institute of Electrical and Electronic Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 41 may be sealed in a chip with the memory control circuit unit 42. Alternatively, the connection interface unit 41 is disposed outside of a chip containing the memory control circuit unit 42.

The memory control circuit unit 42 is coupled to the connection interface unit 41 and the rewritable non-volatile memory module 43. The memory control circuit unit 42 is configured to perform a plurality of logic gates or control commands implemented in a hardware form or in a firmware form. The memory control circuit unit 404 also performs operations such as writing, reading, and erasing data in the rewritable non-volatile memory storage module 43 according to the commands of the host system 11.

The rewritable non-volatile memory module 43 is configured to store the data written by the host system 11. The rewritable non-volatile memory module 43 may include a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

Each of the memory cells in the rewritable non-volatile memory module 43 stores one or a plurality of bits via the change in voltage (also referred to as threshold voltage hereinafter). Specifically, a charge-trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also referred to as "writing data to the memory cells" or "programming the memory cells". As the threshold voltage is changed, each of the memory cells in the rewritable non-volatile memory module 43 has a plurality of storage states. Which storage state one memory cell belongs to may be determined via the application of a read voltage, so as to obtain one or a plurality of bits stored by the memory cell.

In an exemplary embodiment, the memory cells of the rewritable non-volatile memory module 43 may form a plurality of physical programming units, and these physical programming units may form a plurality of physical erasing units. Specifically, the memory cells on the same word line may form one or a plurality of physical programming units. If each memory cell may store two or more bits, the physical programming units on the same word line may at least be classified into lower physical programming units and upper physical programming units. For example, the least significant bit (LSB) of a memory cell belongs to the lower physical programming units, and the most significant bit (MSB) of a memory cell belongs to the upper physical programming units. Generally, in an MLC NAND-type flash memory, the write speed of the lower physical programming units is greater than the write speed of the upper physical programming units, and/or the reliability of the lower physical programming units is greater than the reliability of the upper physical programming units.

In an exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming units may include a data bit area and a redundant bit area. The data bit area contains a plurality of physical pages configured to store user data, and the redundant bit area is configured to store system data (for example, management data such as an error correcting code). In an exemplary embodiment, the data bit area contains 32 physical pages, and the size of one physical sector is 512 bytes (B). However, in other exemplary embodiments, the data bit area may also contain 8, 16, or a greater or lesser number of physical pages, and the size of each of the physical pages may also be greater or smaller. Moreover, the physical erasing unit is the smallest unit of erasing. That is, each of the physical erase units contains the smallest number of memory cells erased together. For example, the physical erasing unit is a physical block.

Figure 5:
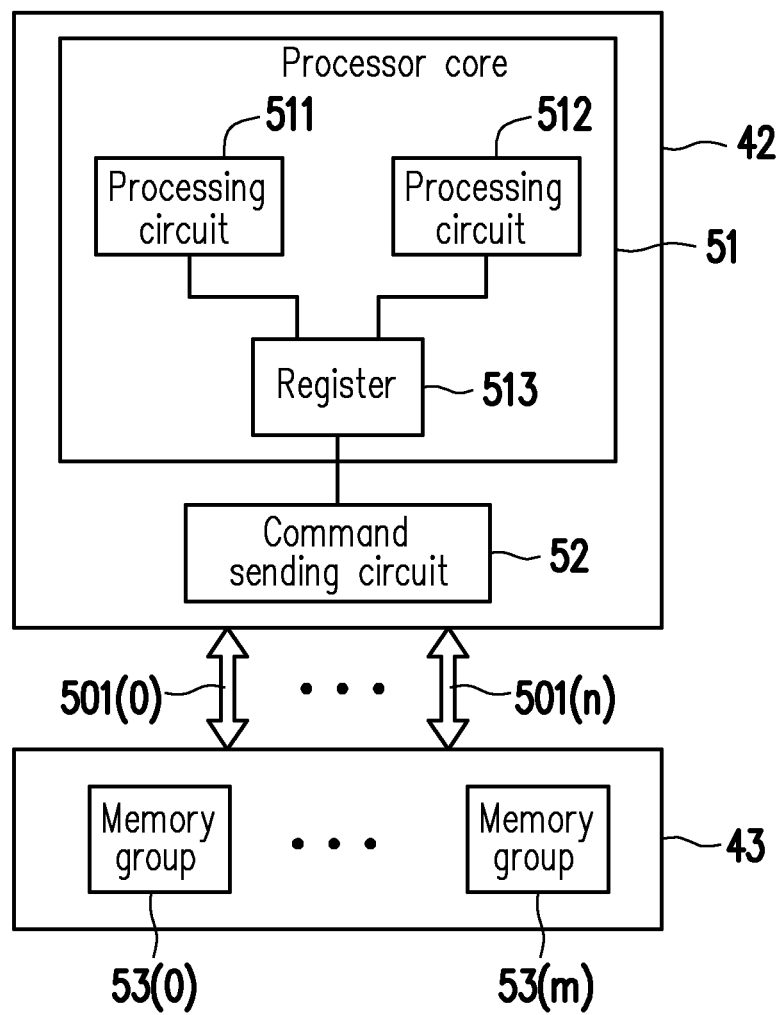
FIG. 5 is a schematic diagram of a memory control circuit unit and a rewritable non-volatile memory module shown according to an exemplary embodiment of the invention.

FIG. 5 is a schematic diagram of a memory control circuit unit and a rewritable non-volatile memory module shown according to an exemplary embodiment of the invention. Referring to FIG. 5, a memory control circuit unit 42 may include a processor core 51 and a command sending circuit 52. The processor core 51 is coupled to the command sending circuit 52. The processor core 51 is configured to control the overall operation of the memory control circuit unit 11 and/or the memory storage device 10. In particular, the processor core 51 is a multi-core architecture, and the memory control circuit unit 11 is a multi-core memory control circuit unit.

The processor core 51 may include a processing circuit 511, a processing circuit 512, and a register 513. The register 513 is coupled to the processing circuit 511, the processing circuit 512, and the command sending circuit 52. The processing circuits 511 and 512 may respectively include a processing circuit such as a central processing unit (CPU) or a microprocessor. When the rewritable non-volatile memory module 43 is to be accessed, at least one of the processing circuits 511 and 512 may generate an operation command and store the operation command in the register 513. The command sending circuit 52 may send one or a plurality of command sequences to the rewritable non-volatile memory module 43 according to the operation command in the register 513, so as to instruct the rewritable non-volatile memory module 43 to perform a corresponding access operation. In addition, the total number of the processing circuits 511 and 512 may be more, which is not limited in the invention.

In an exemplary embodiment, the command sending circuit 52 is a hardware circuit. In an exemplary embodiment, the command sending circuit 52 may also be implemented as a software or firmware module.

In an exemplary embodiment, the memory control circuit unit 42 may also include various circuit modules such as a host interface, a memory interface, an error detection and correction circuit, a buffer memory, and a power management circuit. The host interface may be configured to couple the memory control circuit unit 42 to the host system 11 of FIG. 1. The memory interface may be configured to transmit data and/or signals between the memory control circuit unit 42 and the rewritable non-volatile memory module 43. The error detection and correction circuit may be configured to perform error detection and/or error correction on data read from the rewritable non-volatile memory module 43. The buffer memory may be configured to temporarily store data. The power management circuit may be configured to manage the power supplied to the memory storage device 10.

The rewritable non-volatile memory module 43 includes a plurality of memory groups 53(0) to 53(m). Each of the memory groups 53(0) to 53(m) may include a plurality of memory cells. For example, each of the memory groups 53(0) to 53(m) may refer to one chip-enabled (CE) area. The memory control circuit unit 11 may access any one of the memory groups 53(0) to 53(m) individually or in parallel via channels (also referred to as memory channels) 501(0) to

501(n). In addition, the invention does not limit the total number of the channels 501(0) to 501(n) and the memory groups 53(0) to 53(m). n may be the same as or different from m.

In an exemplary embodiment, one of the processing circuits 511 and 512 may generate an operation command (also referred to as a first operation command). The first operation command may be configured to instruct to access a specific memory group (also referred to as a first memory group) in the memory groups 53(0) to 53(m). For example, the first operation command may be configured to instruct to read data from a certain physical address in the first memory group or write data to a certain physical address in the first memory group. The first operation command may be stored in the register 513.

In response to the specific state information (also referred to as a first state information), the command sending circuit 52 may send a command sequence (also referred to as a first command sequence) to the first memory group according to the first operation command, so as to instruct the first memory group to perform an access operation corresponding to the first operation command. The first state information may reflect the state of the first memory group (also referred to as a first activation state). In particular, the first command sequence may not include a specific command sequence (also referred to as a control command sequence), and the control command sequence is configured to activate the first memory group.

In an exemplary embodiment, the operation of activating the first memory group includes adjusting an on-die termination (ODT) circuit corresponding to the first memory group to a predetermined state. That is, the control command sequence may be configured to adjust the ODT circuit corresponding to the first memory group to the predetermined state. After the ODT circuit corresponding to the first memory group is adjusted to the predetermined state, the ODT circuit may provide a termination impedance to the first memory group, in order to reduce the signal reflection or noise on the signal transmission path of the first memory group.

In an exemplary embodiment, the operation of adjusting the ODT circuit corresponding to the first memory group to the predetermined state may include adjusting the termination impedance provided by the ODT circuit. For example, the impedance value of the termination impedance is adjusted to a predetermined value. For example, the terminating impedance may be provided by an impedance element (e.g., a resistor) within the ODT circuit. Or, in an exemplary embodiment, the operation of adjusting the ODT circuit corresponding to the first memory group to the predetermined state may also include turning on or activating the ODT circuit.

In an exemplary embodiment, the first activation state includes a state in which the first memory group is activated. In particular, in a state in which the first memory group is activated, the ODT circuit corresponding to the first memory group is in the predetermined state. Therefore, when the first operation command needs to be performed, if the first memory group is in an activated state, the command sending circuit 52 may send the first command sequence not including the control command sequence to the first memory group according to the first operation command. Accordingly, in the state in which the first memory group is activated, the first memory group may skip the procedure of adjusting the ODT circuit and directly perform the access operation corresponding to the first operation command according to the first command sequence, thereby effectively improving the access efficiency to the first memory group.

In an exemplary embodiment, in response to another state information (also referred to as a second state information), the command sending circuit 52 may send another command sequence (also referred to as a second command sequence) to the first memory group according to the first operation command, so as to instruct the first memory group to perform the access operation corresponding to the first operation command. Similar to the first state information, the second state information may also reflect the state of the first memory group (also referred to as a second activation state). However, the first activation state is different from the second activation state. In particular, the second command sequence may include the control command sequence configured to activate the first memory group.

In an exemplary embodiment, the second activation state includes a state in which the first memory group is not activated. In particular, in the state in which the first memory group is not activated, the ODT circuit corresponding to the first memory group is not in the predetermined state. Therefore, when the first operation command needs to be performed, if the first memory group is in a not activated state, the command sending circuit 52 may send the second command sequence including the control command sequence to the first memory group according to the first operation command. Thereby, when the first memory group is not activated, according to the second command sequence, the ODT circuit corresponding to the first memory group may be adjusted to the predetermined state first. After the ODT circuit corresponding to the first memory group is adjusted to the predetermined state, the first memory group may perform the access operation corresponding to the first operation command according to the remaining contents in the second command sequence. Thereby, the signal transmission quality of the first memory group may also be guaranteed.

Figure 6:
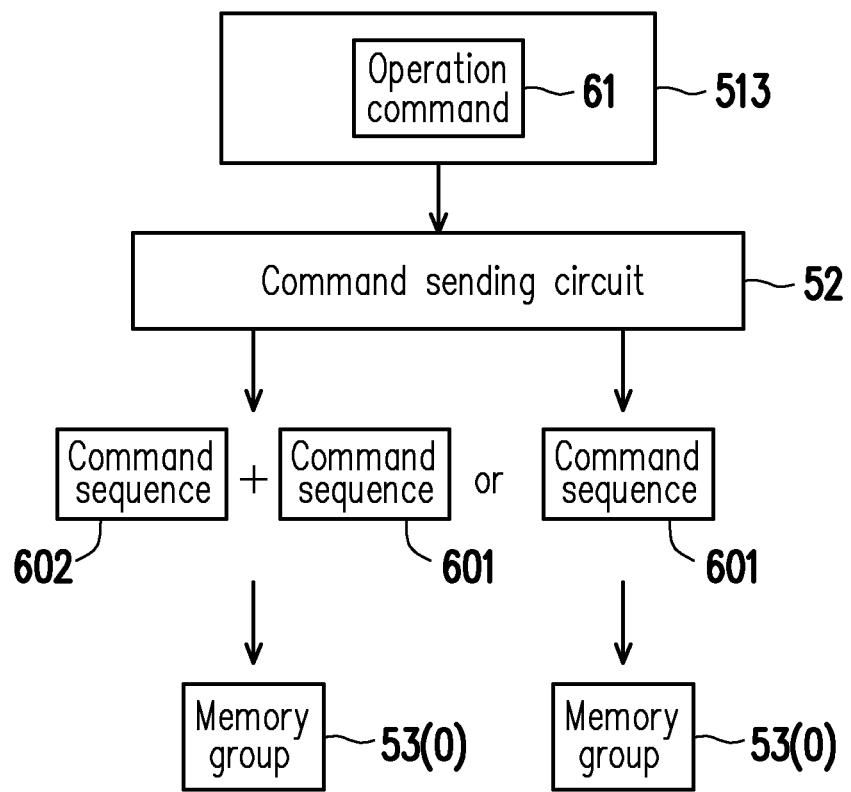
FIG. 6 is a schematic diagram of sending different types of command sequences according to an operation command under different states of the first memory group shown according to an exemplary embodiment of the invention.

FIG. 6 is a schematic diagram of sending different types of command sequences according to an operation command under different states of the first memory group shown according to an exemplary embodiment of the invention. Referring to FIG. 6, it is assumed that an operation command 61 in the register 513 instructs to access the memory group 53(0) (i.e., the first memory group). According to the operation command 61, the command sending circuit 52 may obtain the state information corresponding to the memory group 53(0), reflecting the current state of the memory group 53(0). For example, according to the operation command 61, the command sending circuit 52 may obtain one of the first state information and the second state information. The first state information reflects that the first memory group is activated, and the second state information reflects that the first memory group is not activated.

In an exemplary embodiment, if the obtained state information is the first state information (indicating that the memory group 53(0) is activated), the command sending circuit 52 may send the first command sequence to the memory group 53(0) according to the operation command 61. For example, the first command sequence may include a command sequence (also referred to as an access command sequence) 601. The command sequence 601 is configured to carry command information related to the access operation to be performed. In response to the command sequence 601, the memory group 53(0) may skip (i.e., not perform) the process of adjusting the ODT circuit corresponding to the memory group 53(0), and directly perform the access operation corresponding to the operation command 61 (e.g., read data from the memory group 53(0) or write data to the memory group 53(0)).

In an exemplary embodiment, if the obtained state information is the second state information (indicating that the memory group 53(0) is not activated), the command sending circuit 52 may send the second command sequence to the memory group 53(0) according to the operation command 61. For example, the second command sequence may include command sequences 601 and 602. The command sequence 601 is configured to carry command information related to the access operation to be performed. The command sequence 602 is configured to activate the memory group 53(0) (e.g., adjust the ODT circuit corresponding to the memory group 53(0) to a predetermined state). In particular, the command sequence 602 is sent to the memory group 53(0) before the command sequence 601, so as to instruct the memory group 53(0) to adjust the ODT circuit corresponding to the memory group 53(0) before performing the access operation corresponding to the operation command 61.

That is, when the memory group 53(0) is not activated, the memory group 53(0) may receive the command sequence 602 first, and then receive the command sequence 601. In response to the command sequence 602, the memory group 53(0) may adjust the ODT circuit corresponding to the memory group 53(0). Next, in response to the command sequence 601, the memory group 53(0) may perform an access operation corresponding to the operation command 61 (e.g., read data from the memory group 53(0) or write data to the memory group 53(0)).

In other words, in an exemplary embodiment of FIG. 6, the command sending circuit 52 needs to send the second command sequence including the command sequence 602 to the memory group 53(0) only when the obtained state information is the second state information. If the obtained state information is the first state information, the command sequence sent by the command sending circuit 52 to the memory group 53(0) may not include the command sequence 602. Accordingly, repeated adjustment to the ODT circuit corresponding to the memory group 53(0) may be avoided when the memory group 53(0) is in an activated state. Thus, the access performance to the memory group 53(0) is accelerated. For example, in an exemplary embodiment, the procedure of adjusting the ODT circuit corresponding to the memory group 53(0) is skipped (i.e., not performed), and the access operation corresponding to the operation command 61 is directly performed to save about 150 nanoseconds (ns) of access time, but the invention is not so limited thereto.

Figure 7:
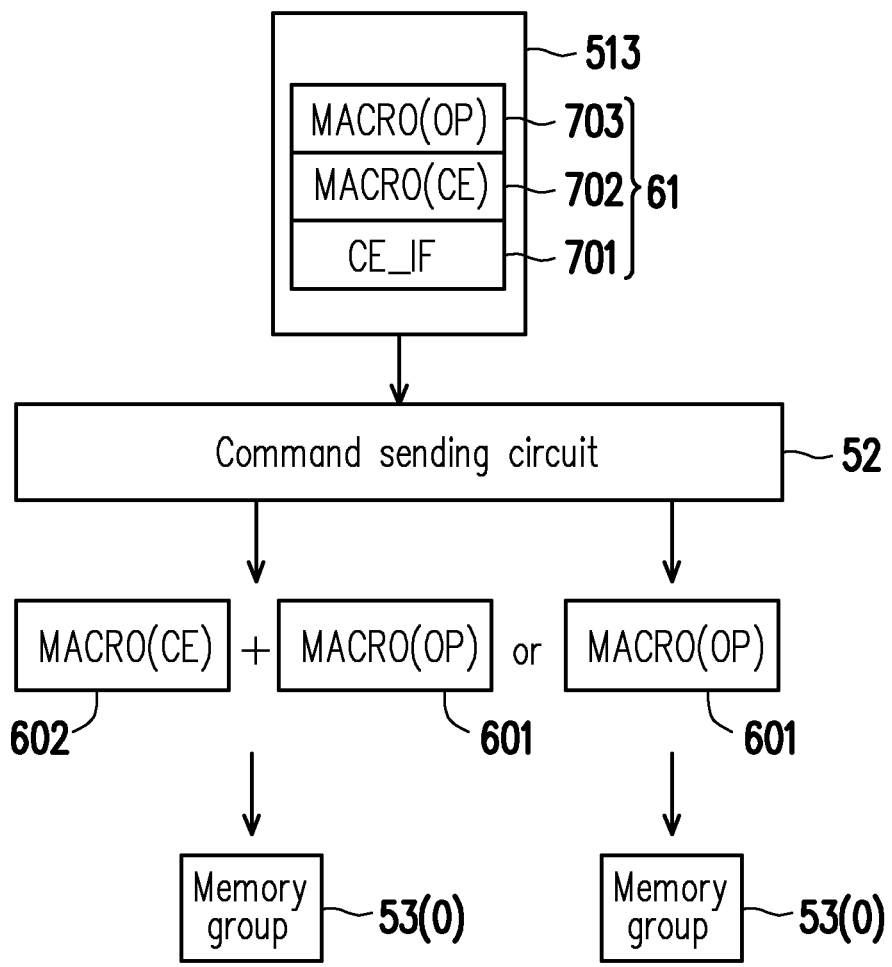
FIG. 7 is a schematic diagram of sending different types of command sequences according to an operation command under different states of the first memory group shown according to an exemplary embodiment of the invention.

FIG. 7 is a schematic diagram of sending different types of command sequences according to an operation command under different states of the first memory group shown according to an exemplary embodiment of the invention. Referring to FIG. 7, in an exemplary embodiment, the operation command 61 may include a group identification information 701, a control command sequence 702, and an access command sequence 703. The group identification information 701, the control command sequence 702, and the access command sequence 703 may be continuously stored in the register 513.

The group identification information 701 corresponds to the memory group 53(0). That is, the group identification information 701 may reflect that the memory group to be instructed by the operation command 61 is the memory group 53(0). The control command sequence 702 may carry control information configured to activate the memory group 53(0) (e.g., adjust the ODT circuit corresponding to the memory group 53(0)). The access command sequence 703 may be configured to carry command information related to the access operation to be performed. For example, the command information may reflect that the access operation to be performed is a read, write, or erase operation, the physical address to be accessed, and the like.

In an exemplary embodiment, the command sending circuit 52 may determine that the memory group 53(0) currently to be accessed is activated according to the group identification information 702 and the obtained first state information. When the memory group 53(0) is activated, the command sending circuit 52 may ignore the control command sequence 702 and send a first command sequence according to the access command sequence 703. For example, the command sending circuit 52 may filter out the control command sequence 702 (i.e., not send the control command sequence 702) and reflect (e.g., add, transfer, or copy) the command information in the access command sequence 703 to the command sequence 601. Then, the command sending circuit 52 may send the command sequence 601 to the memory group 53(0) to instruct the memory group 53(0) to perform the access operation corresponding to the operation command 61.

In an exemplary embodiment, the command sending circuit 52 may determine that the memory group 53(0) currently to be accessed is not activated according to the group identification information 702 and the obtained second state information. When the memory group 53(0) is not activated, the command sending circuit 52 may send the second command sequence according to the control command sequence 702 and the access command sequence 703. For example, the command sending circuit 52 may reflect (e.g., add, transfer, or copy) the command information in the access command sequence 703 to the command sequence 601 and reflect (e.g., add, transfer, or copy) the control information in the control command sequence 702 to the command sequence 602. Then, the command sending circuit 52 may send the command sequences 602 and 601 to the memory group 53(0) in sequence to instruct the memory group 53(0) to activate the ODT circuit corresponding to the memory group 53(0) and subsequently perform the access operation corresponding to the operation command 61.

In an exemplary embodiment, according to the group identification information 701, the command sending circuit 52 may obtain the state information corresponding to the memory group 53(0). The state information may include a state flag. The value of the state flag may reflect the state of the first memory group. For example, when the value of the state flag is "1" (that is, the obtained state information is the first state information), the first memory group is in an activated state, and when the value of the state flag is "0" (that is, the obtained state information is the second state information), the first memory group is in a not activated state, and the invention is not limited thereto. In an exemplary embodiment, the command sending circuit 52 may store the state flag in the internal storage space thereof (e.g., an internal register), and may update the state flag according to the change of the state of the first memory group.

In an exemplary embodiment, according to the group identification information 701 (or the operation command 61), the command sending circuit 52 may update the access flag corresponding to the memory group 53(0). For example, according to the group identification information 701, the command sending circuit 52 may set the value of the access flag corresponding to the memory group 53(0) to "1". After the state information corresponding to the memory group 53(0) is read, the command sending circuit 52 may compare the access flag corresponding to the memory group 53(0) with the state flag corresponding to the memory group 53(0). If the access flag corresponding to the memory group 53(0) is the same as the state flag corresponding to the memory group 53(0) (for example, both have the value "1"), the memory group 53(0) accessed by the operation command 61 is activated. Or, if the access flag corresponding to the memory group 53(0) is different from the state flag corresponding to the memory group 53(0) (e.g., the value of the access flag is "1", and the value of the state flag is "0"), the memory group 53(0) to be accessed instructed by the operation command 61 is not activated. The command sending circuit 52 may send the first command sequence or the second command sequence to the memory group 53(0) according to the comparison result.

In an exemplary embodiment, in response to a certain comparison result (also referred to as a first comparison result) (i.e., the access flag corresponding to the memory group 53(0) is the same as the state flag corresponding to the memory group 53(0)), the command sending circuit 52 may send the command sequence 601 to the memory group 53(0) according to the access command sequence 703. Or, in response to another comparison result (also referred to as a second comparison result) (i.e., the access flag corresponding to the memory group 53(0) is different from the state flag corresponding to the memory group 53(0) (e.g., the value of the access flag is "1", and the value of the state flag is "0")), the memory group 53(0) to be accessed instructed by the operation command 61 is not activated. At this time, the command sending circuit 52 may send the command sequences 601 and 602 to the memory group 53(0) according to the control command sequence 702 and the access command sequence 703.

Returning to FIG. 5, in an exemplary embodiment, the memory control circuit unit 11 may access the memory groups 53(0) and 53(1) via the channel 501(0). In particular, when the memory group 53(0) is activated (i.e., the ODT circuit corresponding to the memory group 53(0) is adjusted to a predetermined state), the memory group 53(1) is switched to a not activated state. Similarly, when the memory group 53(1) is activated (i.e., the ODT circuit corresponding to the memory group 53(1) is adjusted to the predetermined state), the memory group 53(0) is switched to the not activated state. The memory control circuit unit 11 (e.g., the command sending circuit 52) may update the state flags corresponding to the memory groups 53(0) and 53(1) according to the current state (i.e., activated or not) of the memory groups 53(0) and 53(1).

In an exemplary embodiment, the memory control circuit unit 11 may include a combination of more of the processor core 51 and the command sending circuit 52. Each combination of the processor core 51 and the command sending circuit 52 may control and access the memory group 53($i$) (or 53($i$) and 53($i$+1)) via one of the channels 501(0) to 501($n$), respectively. i is a positive integer between zero and m−1.

Figure 8:
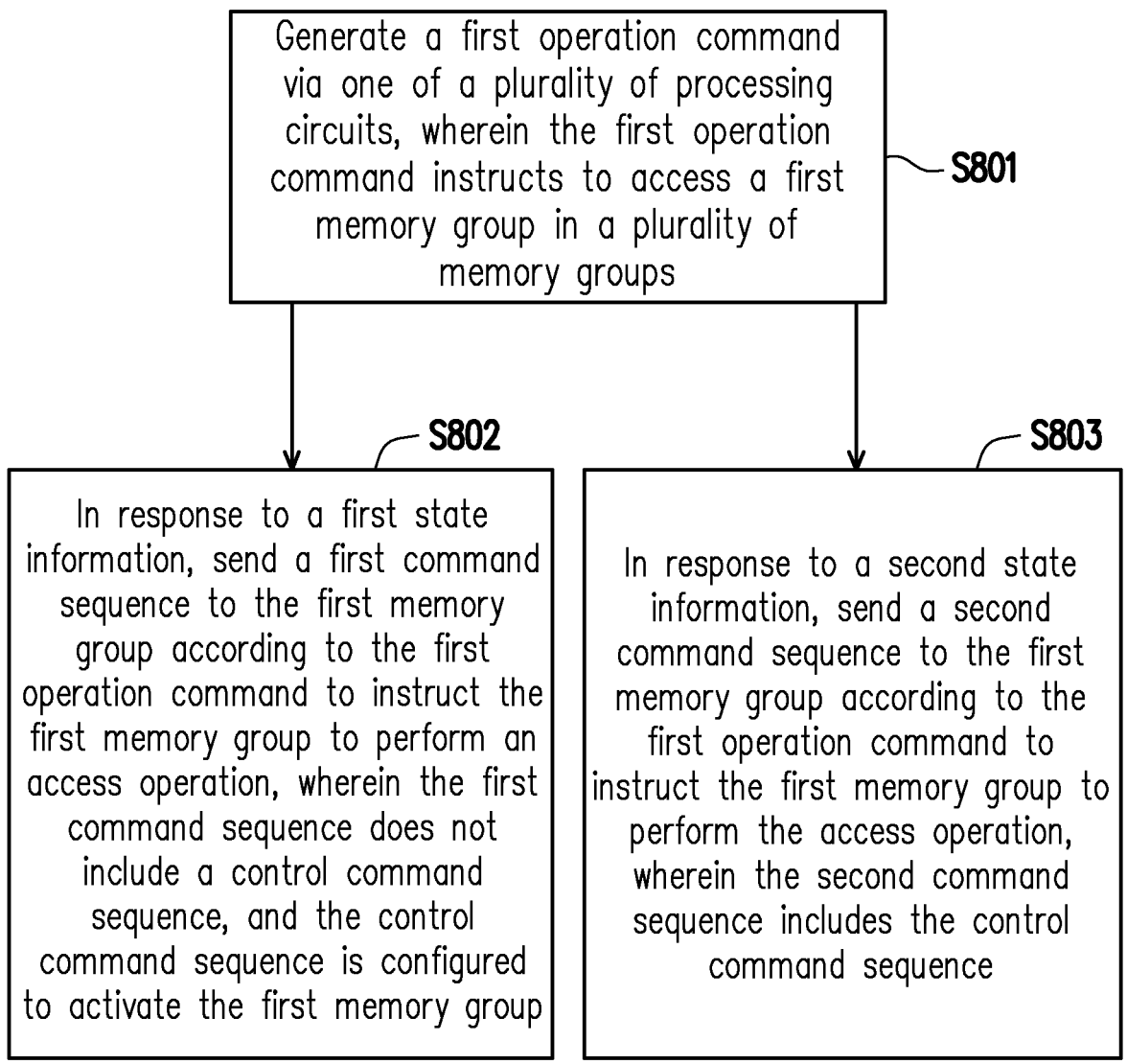
FIG. 8 is a flowchart of a memory control method shown according to an exemplary embodiment of the invention.

FIG. 8 is a flowchart of a memory control method shown according to an exemplary embodiment of the invention. Referring to FIG. 8, in step S801, a first operation command is generated via one of a plurality of processing circuits, wherein the first operation command instructs to access the first memory group of the plurality of memory groups. After step S801, one of steps S802 and S803 may be performed.

In an exemplary embodiment, in response to a first state information, in step S802, a first command sequence is sent to the first memory group according to the first operation command to instruct the first memory group to perform an access operation. In particular, the first state information reflects the first activation state of the first memory group, the first command sequence does not include a control command sequence, and the control command sequence is configured to activate the first memory group.

Or, in an exemplary embodiment, in response to a second state information, in step S803, a second command sequence is sent to the first memory group according to the first operation command to instruct the first memory group to perform an access operation. In particular, the second state information reflects a second activation state of the first memory group, and the second command sequence includes the control command sequence to activate the first memory group.

However, each step in FIG. 8 is as described in detail above, and is not repeated herein. It should be mentioned that, each step in FIG. 8 may be implemented as a plurality of program codes or circuits, and the invention is not limited thereto. Moreover, the method of FIG. 8 may be used with the above exemplary embodiments, and may also be used alone, and the invention is not limited thereto.

Based on the above, an exemplary embodiment of the invention proposes to send different types of command sequences according to the same operation command under different states of the memory group, so that under the premise of not affecting the operation stability of the memory group, the access performance of the multi-core memory control circuit unit to the memory group may be effectively improved.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A memory control method, configured for a rewritable non-volatile memory module, wherein the rewritable non-volatile memory module comprises a plurality of memory groups, and the memory control method comprises:

generating a first operation command via one of a plurality of processing circuits, wherein the first operation command instructs to access a first memory group in the plurality of memory groups, wherein the first operation command comprises a control command sequence; and in response to a first state information of the first memory group, sending a first command sequence to the first memory group according to the first operation command to instruct the first memory group to perform an access operation, wherein the first command sequence does not comprise the control command sequence, wherein the first state information reflects that the first memory group is in an activated state, and when the first memory group is in the activated state, an on-die termination circuit corresponding to the first memory group has been turned on, in response to a second state information of the first memory group, sending a second command sequence to the first memory group according to the first operation command to instruct the first memory group to turn on the on-die termination circuit corresponding to the first memory group and perform the access operation, and the second command sequence comprises the control command sequence, the control command sequence is configured to turn on the on-die termination circuit corresponding to the first memory group, wherein the second state information reflects a second activation state of the first memory group, wherein the second activation state comprises a state in which the first memory group is not in the activated state.

2. The memory control method of claim 1, wherein the second command sequence further comprises an access command sequence, the access command sequence carries a command information related to the access operation, and the control command sequence is transmitted to the first memory group before the access command sequence.

3. The memory control method of claim 1, wherein the first operation command comprises a group identification information and an access command sequence, and the group identification information reflects that a memory module to be accessed instructed by the first operation command is the first memory module.

4. The memory control method of claim 3, wherein the step of sending the first command sequence to the first memory group according to the first operation command in response to the first state information comprises:
   determining the first memory group is in the activated state according to the group identification information and the first state information; and
   in response to the first memory group being determined to be in the activated state, sending the first command sequence to the first memory group according to the first operation command, wherein the first command sequence without the control command sequence.

5. The memory control method of claim 1, wherein the step of sending the first command sequence to the first memory group according to the first operation command in response to the first state information comprises:
   updating an access flag corresponding to the first memory module according to the first operation command;
   comparing the access flag corresponding to the first memory module with a state flag corresponding to the first memory module; and
   sending the first command sequence to the first memory group according to a comparison result.

6. A memory storage device, comprising:
   a connection interface unit configured to be coupled to a host system;
   a rewritable non-volatile memory module; and
   a memory control circuit unit coupled to the connection interface unit and the rewritable non-volatile memory module,
   wherein the rewritable non-volatile memory module comprises a plurality of memory modules,
   the memory control circuit unit comprises a plurality of processing circuits,
   one of the plurality of processing circuits is configured to generate a first operation command, and the first operation command instructs to access a first memory group in a plurality of memory groups, wherein the first operation command comprises a control command sequence,
   in response to a first state information of the first memory group, the memory control circuit unit is configured to send a first command sequence to the first memory group according to the first operation command to instruct the first memory group to perform an access operation, wherein the first command sequence does not comprise the control command sequence,
   wherein the first state information reflects that the first memory group is in an activated state, and when the first memory group is in the activated state, an on-die termination circuit corresponding to the first memory group has been turned on,
   in response to a second state information of the first memory group, the memory control circuit unit is configured to send a second command sequence to the first memory group according to the first operation command to instruct the first memory group to turn on the on-die termination circuit corresponding to the first memory group and perform the access operation, and the second command sequence comprises the control command sequence, the control command sequence is configured to turn on the on-die termination circuit corresponding to the first memory group,
   wherein the second state information reflects a second activation state of the first memory group, wherein the second activation state comprises a state in which the first memory group is not in the activated state.

7. The memory storage device of claim 6, wherein the second command sequence further comprises an access command sequence, and the access command sequence carries a command information related to the access operation, and the control command sequence is transmitted to the first memory group before the access command sequence.

8. The memory storage device of claim 6, wherein the first operation command comprises a group identification information and an access command sequence, and the group identification information reflects that a memory module to be accessed instructed by the first operation command is the first memory module.

9. The memory storage device of claim 8, wherein the operation of the memory control circuit unit sending the first command sequence to the first memory group according to the first operation command in response to the first state information comprises:
   determining the first memory group is in an activated state according to the group identification information and the first state information; and
   in response to the first memory group being determined to be in the activated state, sending the first command sequence to the first memory group according to the first operation command, wherein the first command sequence without the control command sequence.

10. The memory storage device of claim 6, wherein the operation of the memory control circuit unit sending the first command sequence to the first memory group according to the first operation command in response to the first state information comprises:
   updating an access flag corresponding to the first memory module according to the first operation command;
   comparing the access flag corresponding to the first memory module with a state flag corresponding to the first memory module; and
   sending the first command sequence to the first memory group according to a comparison result.

11. A memory control circuit unit, configured to control a rewritable non-volatile memory module, wherein the rewritable non-volatile memory module comprises a plurality of memory modules, and the memory control circuit unit comprises:
   a plurality of processing circuits; and
   a command sending circuit coupled to the plurality of processing circuits,
   wherein one of the plurality of processing circuits is configured to generate a first operation command, and the first operation command instructs to access a first memory group in a plurality of memory groups, wherein the first operation command comprises a control command sequence, in response to a first state information of the first memory group, the command sending circuit is configured to send a first command sequence to the first memory group according to the first operation command to instruct the first memory group to perform an access operation, wherein the first command sequence does not comprise the control command sequence, wherein the first state information reflects that the first memory group is in an activated state, and when the first memory group is in the activated state, an on-die termination circuit corresponding to the first memory group has been turned on, in response to a second state information of the first memory group, the command sending circuit is configured to send a second command sequence to the first memory group according to the first operation command to instruct the first memory group to turn on the on-die termination circuit corresponding to the first memory group and perform the access operation, and the second command sequence comprises the control command sequence, the control command sequence is configured to turn on the on-die termination circuit corresponding to the first memory group, wherein the second state information reflects a second activation state of the first memory group, wherein the second activation state comprises a state in which the first memory group is not in the activated state.

12. The memory control circuit unit of claim 11, wherein the second command sequence further comprises an access command sequence, the access command sequence carries a command information related to the access operation, and the control command sequence is transmitted to the first memory group before the access command sequence.

13. The memory control circuit unit of claim 11, wherein the first operation command comprises a group identification information and an access command sequence, and the group identification information reflects that a memory module to be accessed instructed by the first operation command is the first memory module.

14. The memory control circuit unit of claim 13, wherein the operation of the command sending circuit sending the first command sequence to the first memory group according to the first operation command in response to the first state information comprises:

determining the first memory group is in an activated state according to the group identification information and the first state information; and in response to the first memory group being determined to be in the activated state, sending the first command sequence to the first memory group according to the first operation command, wherein the first command sequence without the control command sequence.

15. The memory control circuit unit of claim 11, wherein the operation of the command sending circuit sending the first command sequence to the first memory group according to the first operation command in response to the first state information comprises:

updating an access flag corresponding to the first memory module according to the first operation command;

comparing the access flag corresponding to the first memory module with a state flag corresponding to the first memory module; and sending the first command sequence to the first memory group according to a comparison result.

* * * * *